Sept. 13, 1960

W. R. LONG 2,952,370

MATERIAL HANDLING EQUIPMENT

Filed Jan. 2, 1957

3 Sheets-Sheet 1

INVENTOR
W.R. LONG

BY *Wyatt Dowell*
ATTORNEY

Sept. 13, 1960 W. R. LONG 2,952,370
MATERIAL HANDLING EQUIPMENT
Filed Jan. 2, 1957 3 Sheets-Sheet 2
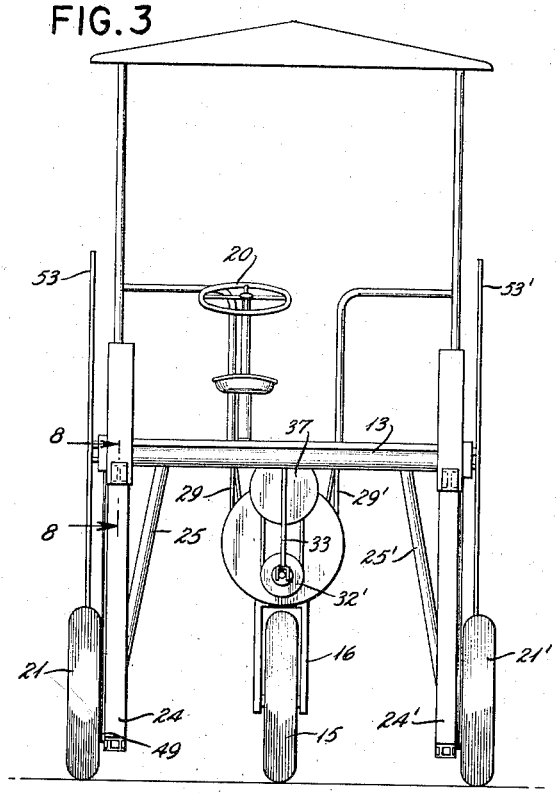
FIG. 3
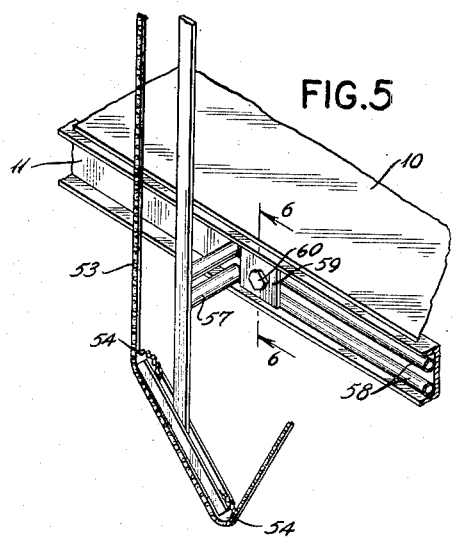
FIG. 5
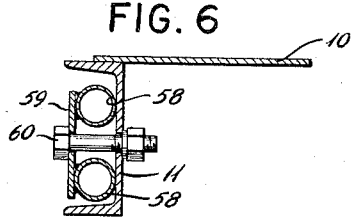
FIG. 6
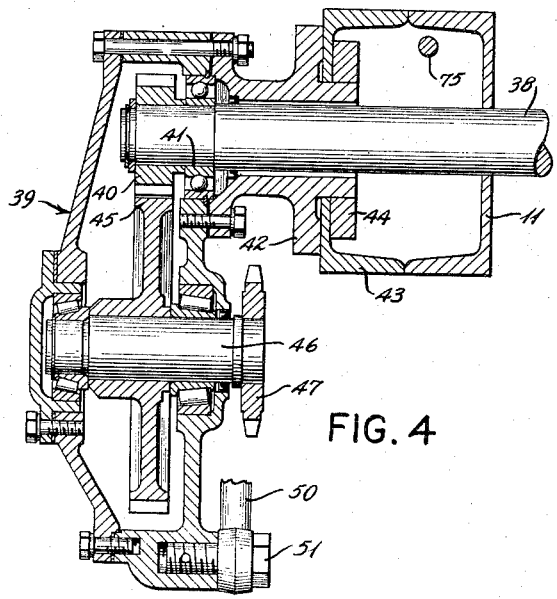
FIG. 4
FIG. 10
INVENTOR
W.R. LONG
BY *J. Yates Dowell*
ATTORNEY Sept. 13, 1960 W. R. LONG 2,952,370
MATERIAL HANDLING EQUIPMENT
Filed Jan. 2, 1957 3 Sheets-Sheet 3
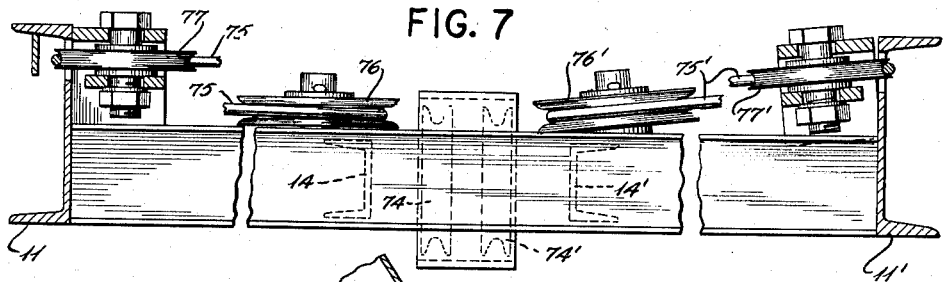
FIG. 7
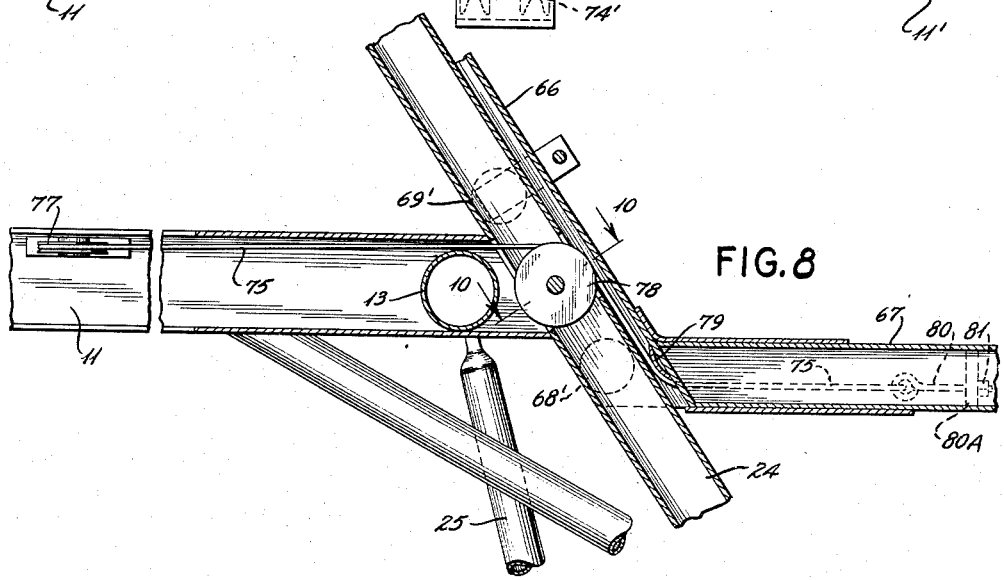
FIG. 8
FIG. 9
INVENTOR
W.R. LONG
ATTORNEY

United States Patent Office 2,952,370
Patented Sept. 13, 1960

2,952,370

MATERIAL HANDLING EQUIPMENT

William R. Long, P.O. Box 1109, Tarboro, N.C.

Filed Jan. 2, 1957, Ser. No. 632,146

7 Claims. (Cl. 214—5.5)

The present invention relates to agricultural equipment and more particularly to tobacco harvesters which are adapted to be moved through a field and carry the produce to a drying barn without requiring intermediate handling.

Heretofore various types of agricultural equipment have been used and means have been provided for harvesting tobacco according to Long Patent No. 2,704,158 and a patent application of Long and Rawlins, Serial No. 629,302, filed Dcember 19, 1956, for Tobacco Harvesting Device. However, the drive of the front wheel involved complications because of complicated control and drive connections from the motor mounted on the fork, and the fork lift required complicated mechanism which was expensive to build.

An object of the invention is to provide equipment which overcomes the difficulties and problems enumerated above.

Another object of the present invention is to provide an agricultural machine of general utility, particularly suitable for the harvesting and handling of tobacco, while being useful as a tractor and as material handling equipment for materials of all types.

Another object of the invention is to provide a self-propelled vehicle with infinitely variable speed control, whereby the vehicle may be moved at the optimum speed for the work being done.

A further object of the invention is to provide a tractor vehicle of general utility which is simple to manufacture, inexpensive to operate and which can be used by relatively unskilled personnel without requiring lengthy periods of instruction.

Figure 1:
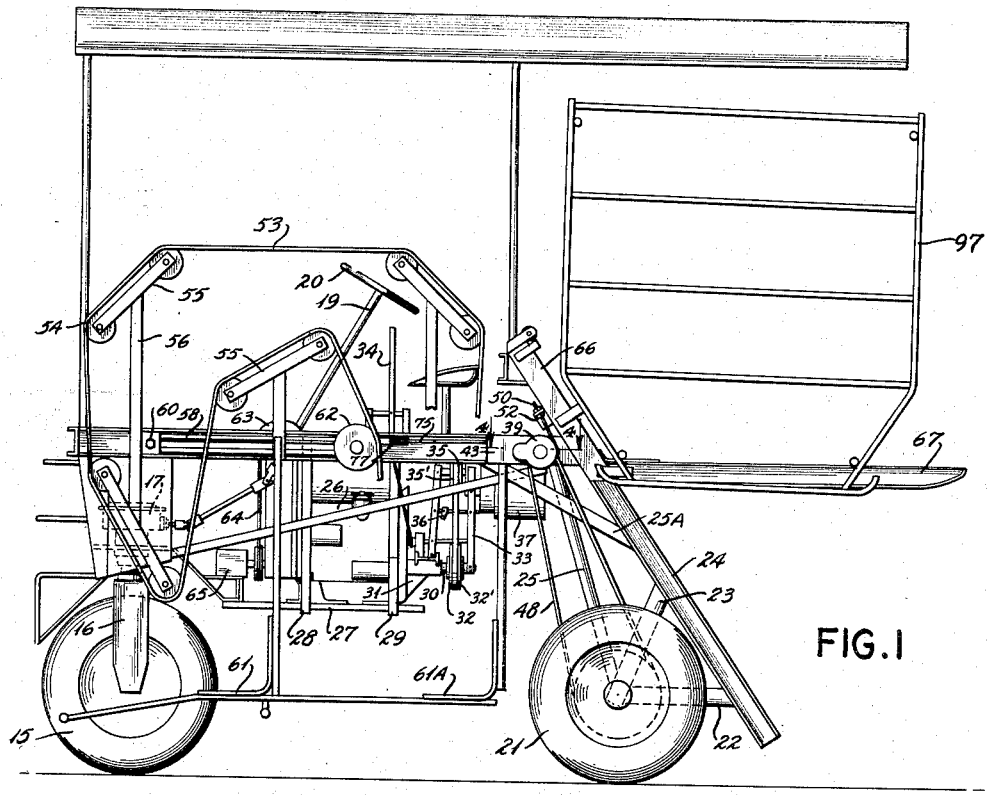

Other and further objects will be apparent as the description proceeds and upon reference to the accompanying drawings wherein:

Fig. 1 is a side elevation of the tobacco harvester ready for operation in the field with the fork lift in raised position and supporting a tobacco receiving rack, part of the conveyor being broken away to show the driving mechanism more clearly.

Figure 2:
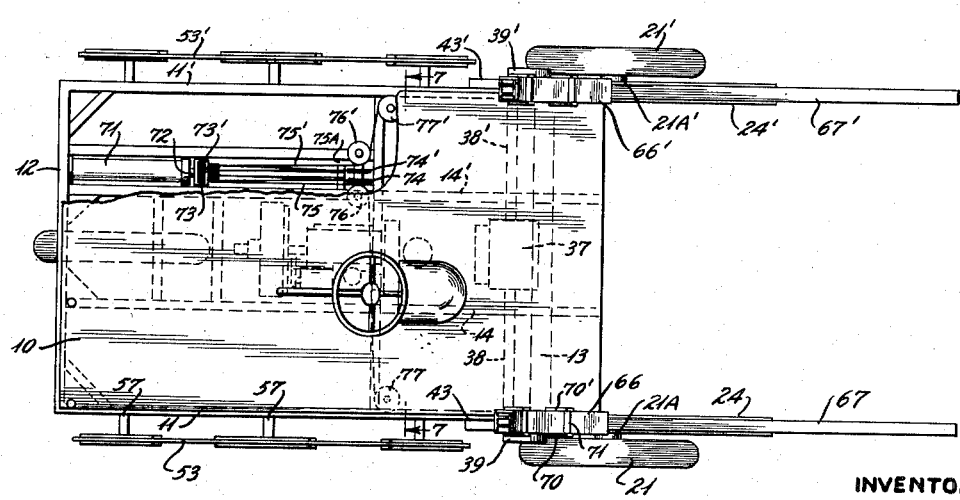

Fig. 2, a plan view of the harvester of Fig. 1, with the workmen supporting seats, sun shade, and tobacco receiving rack removed;

Fig. 3, a rear end view of the tobacco harvester of Fig. 1, with the workmen supporting seats, sun shade, and tobacco receiving rack omitted;

Fig. 4, a section taken on line 4—4 of Fig. 1, showing a gear reduction and chain tightening unit and the torque bar providing for adjustment;

Fig. 5, an enlarged perspective showing one manner of securing the removable conveyor supporting frames to the frame;

Fig. 6, a detail section taken on line 6—6 to show the detachable connection;

Fig. 7, an enlarged transverse section taken substantially on line 7—7 of Fig. 2 with parts broken away and parts omitted showing the fork lift cable guide pulleys;

Fig. 8, a fragmentary longitudinal section with parts broken away and parts omitted, showing one cable guided over the last guide pulleys and showing the connection of the end of the same cable to one tine of the fork lift;

Fig. 9, a perspective with parts broken away showing the harvester used as a tractor with a 3-point "Ford-Ferguson" type implement support; and Fig. 10, a fragmentary section taken on line 10—10 of Fig. 8 and showing the mounting of one tine by its supporting rollers in the rail.

Briefly stated, the present invention comprises a frame having a platform, a ground engaging wheel in a steerable fork at the front end supporting the front end of the frame and a pair of ground engaging wheels on downwardly and rearwardly extending rail members supporting the rear end of the frame, the rear wheels being driven through suitable driving connections from a motor suspended from the frame. A movable tine is mounted on each rearwardly and downwardly extending rail and both tines are simultaneously movable from and toward the ground by cables operated from a hydraulic cylinder, the tines providing a fork lift of general utility which is particularly useful in raising and lowering tobacco carrying racks. Conveyors similar to those of the previous patent and application and workmen supporting seats are mounted on auxiliary side frames which are removably secured to the sides of the frame. The conveyors are driven from the motor at a selected speed in accordance with the requirements. With or without removal of the auxiliary side frames with the conveyors and/or seats, an agricultural implement such as a toothed harrow or the like may be supported for vertical adjustment by easily applied attachments including a tripod and lifting bar, with drawbars, drag links, etc.

Upon more detailed reference to the drawing, the agricultural machine of the present invention includes a floor 10 supported on a rectangular frame having side channel members 11, 11', a front channel member 12, a tubular rear member 13, and central longitudinal frame members 14, 14'. The front end of the frame is supported by a ground engaging wheel 15 rotatably mounted in a fork 16 which is rotatably mounted for movement about a vertical axis in a well known manner, the fork being steered by means of a gear box 17, an intermediate shaft 18 connected by universal joints with the worm shaft of the gear box and a steering shaft 19 having a conventional steering wheel 20 whereby an operator may guide the vehicle. In the following description where identical parts occur on the left and right sides of the machine, the parts are referred to by the same numerals with parts on the right having a prime mark (') added.

Rear ground engaging wheels 21, 21' are rotatably mounted on suitable stub shafts 21A, 21A' supported on the ends of struts 22, 23 and 22', and 23', respectively, the other ends of the struts being fixed to downwardly and rearwardly extending rails 24, 24' secured intermediate their ends to the rear ends of the frame members 11 and 11' respectively. Further bracing of the stub shafts is obtained by braces 25, 25' which extend from the stub shafts 21A, 21A' to intermediate portions on the rear frame member 13 whereby the wheels and the rails are maintained in accurate alignment at all times. Additional braces 25A and 25A' extending from channels 11, 11' to rails 24, 24' provide further reinforcement.

Power is delivered to the rear ground engaging wheels 21, 21' from a motor 26 suitably mounted centrally of the frame on a platform 27 suspended from the central longitudinal frame members 14 and 14' by means of struts 28, 29, 28', 29'. Projecting rearwardly from the motor 26 is a splined shaft 30 rotatably supported in a bearing bracket 31 and carrying a variable V-type pulley having a fixed half 32 and a movable half 32', the movable half being operable toward and away from the fixed half by means of a lever 33 pivoted at its upper ends and operable through suitable linkage from a control lever 34 extending above the platform. A cooperating split pulley having one pulley half 35 fixed on a shaft 36 while the other half 35' is movable relative thereto by a lever 36A which is pivoted at its lower end to bracket 31, the levers 33 and 36A being operatively connected together by a link 34B having a spring. Shaft 36 carries power into a combination reversing and speed change transmission and differential unit 37 which provides power to shafts 38, 38' which transmits power to angularly adjustable gear reduction units 39, 39' mounted on the outer ends of the shaft 38 and 38' respectively.

The gear reduction unit 39 being identical with the gear reduction unit 39' only one will be described and corresponding parts in the other will be indicated by the same numeral with a prime mark ('). Shaft 38 carries a pinion gear 40 fixed thereon while an antifriction bearing 41 maintains the housing 39 in operative relation with respect to the shaft 38 for adjustment. A removable boss 42 cooperates with a reinforcing channel shaped frame element 43 being retained in position by a nut 44 or the like, the frame element 43 also being secured to the rail member 24 by welding or the like. The pinion gear 40 drives a large gear 45 fixed on shaft 46 rotatably mounted in suitable bearings in the housing 39, while a sprocket 47 on the shaft 46 drives a chain 48 which in turn drives a sprocket 49 fixed to the hub of the wheel 21. It will be evident that similar parts serve to drive the wheel 21' a differential in transmission housing 37 providing for turning of the vehicle. To obtain proper tensile adjustment of chain 48, an eye bolt 50 is mounted with its eye receiving a bolt 51 secured to the free or rear end of the housing 39, the threaded end of the eye bolt passing through an aperture in a bracket 52 fixed on rail 24 and being retained in adjusted position by nuts on each side of a flange of the bracket.

It will be noted that the driving pulleys formed of pulley halves 32, 32' and 35, 35' are similar to the variable speed pulleys in the prior patent and application and that such pulley arrangement serves as a clutch as well as an infinitely variable speed control while the transmission differential unit 37 has the usual reverse and several forward speeds for obtaining the optimum speed of movement of the chain.

Conveyor chain 53, 53' carry the usual tobacco leaf engaging clips, work holding buckets or the like and pass over a plurality of guide sprockets 54 mounted on the ends of sprocket supporting cross arms 55 which are mounted on the ends of vertical posts 56 attached to horizontal elements 57 which are fixed to longitudinal rods 58, secured to the frame element 11 by means of plates 59 secured in position by bolts 60, the posts 56, cross arms 55, horizontal elements 57 and rods 58 providing an auxiliary conveyor supporting frame which is removable and attachable as a unit to the main frame in proper operative position. Workmen supporting seats 61, 61A are supported in any suitable manner as being mounted on the auxiliary frame and/or on suitable structure in the main frame. The conveyor chain 53 is driven by means of sprocket 62 mounted on a stub shaft which is driven by an intermediate shaft and universal joints from the worm gear in a worm gear housing 63 the worm of which is driven by a belt 64 from a forward extension of the crankshaft, such forward extension of the crankshaft also serving to operate hydraulic pump 65 for operating the fork lift.

Suitable means are provided for discontinuing the operation of the conveyor chains, such as by releasing the belt 64 which may be normally tightened by an idler pulley.

The fork life includes angle members formed by channel members 66, 66', connected to I-beam tines or bars 67, 67', respectively, such tines being substantially horizontal on their upper surface and having curved runner-like ends. Tine 67 and channel-shaped member 66 are secured together by welding and suitable reinforcement. The channel-shaped member 66 carries three pairs of rollers 68, 68A, which run in the outer channel of the pair of I-beams 69, 69A, which are secured together by welding to provide the rail structure 24. The channel member 66 is reinforced by rigid straps 70, 70', welded to the flanges of the channel while a strut element 71 maintains such straps in parallel operative relation to prevent spreading of the flanges. For raising and lowering the tines of the fork lift, a hydraulic cylinder 71 having the usual piston and piston rod 72 carries movable pulley blocks 73, 73', which cooperate with stationary pulley blocks 74, 74', with cables 75, 75', each having one of its ends fixed to a crossmember 75A and reeved over the corresponding movable and stationary pulley blocks. The left pulley system will be described which includes cable 75 fixed at one end to crossmember 75A and reeved through movable pulley block 73 on the piston rod 72 and fixed pulley block 74, said cable 75 passing over a guide pulley 76 mounted in central longitudinal member 14' and passing over a guide pulley 77 and outside of the web of frame member 11 and thence between the webs of side channel member 11 and channel element 43 and over a pulley 78 located in a recess formed in I-beams 69, 69A and suitably mounted for rotation on a shaft and thereafter cable 75 passes around grooved curved guide element 79 located at the angle between tine 67 and member 66, the other end of cable 75 being connected to an eye bolt 80, the shank of which passes through a fixed bracket 80A being adjustable by means of a nut 81. It will be noted that pulleys 76' and 77' because of the closeness thereof are disposed at an angle so the cable 75' will run tangent to such pulleys.

It will be noted that a similar cable 75' extends through pulley blocks 73', 74' and over guide pulleys 76', 77' and 78' (not shown) and to tine 67', such cables 75 and 75' being accurately adjustable by means of nuts 81, 81' and eye bolts 80, 80', whereby accurate and level horizontal relation may be obtained between the tines 67, 67'.

It will be evident that suitable hydraulic supply lines are provided for the transmission of hydraulic fluid from the pump 65 to the cylinder 71 and suitable safety by-pass valves and hydraulic liquid reservoir are provided in a well-known manner with suitable control available to the operator.

The auxiliary conveyors and seat supporting frames may be removed from the vehicle, and even while such conveyors and seats are in place, the machine may be used as a tractor with the conventional Ford-Ferguson three-point type suspension, suitable structure therefor being shown in Fig. 9.

A channel bar 82 is transversely arranged between struts 22, 22', and secured in position by bolts or other suitable means, such bar carrying downwardly extending luge 83, 83', to which are attached drawbars 84, 84' which are pivotally connected to lugs 85, 85' on a harrow or the like implement 86. The harrow has the usual upwardly extending tripod on the body formed of front legs 87, 87', and one or more rear legs 88, 88', all of which legs extend to a point forming a pivot 89 to which a control bar 90 is pivotally attached, the forward end of the control bar 90 being pivotally mounted on a fixed pivot point 91 suitably fixed relative to the vehicle by any suitable type structure or the like which may include a strut 92 extending from the frame member 13 and a strut 93 extending from the channel bar 82 and one or more strut members (not shown) to fix the pivot point 91, whereby a parallelogram type of linkage is provided permitting vertical movement of the harrow 86 while maintaining substantially parallel relation of such harrow to its original position. A horizontal bar 94 is secured at each of its ends to the angle between channel member 66 and tine 67 and in the angle between channel member 66' and tine 67' being retained in position by suitable latches 95, 95'. Drag links 96, 96' extend from horizontal bar 94 to draw bars 84, 84' for raising and lowering the harrow 86. Said bar 94 may be of the truss type to provide suitable depth whereby the length of drag links 96, 96', respectively may be of less length so that the conventional Ford-Ferguson drag links may be used.

It will be evident that one of the drag links 96 or 96' is adjustable as to length in a well-known manner providing for leveling. From the above description it is believed evident that the raising and lowering of the tines of the fork lift through the actuation of cylinder 71 will control the depth of operation of the harrow 86 or other implement and therefore the structure has a wide utility rendering the machine suitable for year round use, and not being limited solely to harvesting of tobacco.

It will be apparent that the foregoing fork lift is suitable for a wide variety of applications for which fork lifts normally are used, including the raising and lowering of a tobacco supporting rack 97, the raising and handling of pallets with varying types of loads thereon.

Although the tobacco stick support on the platform has been omitted for simplicity, it will be apparent that a support similar to that of the prior patent and application are used and the loopers remove the tobacco leaves from the conveyors and secure the leaves to the stick after which the stick is placed in the rack 97.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. An agricultural machine for movement over a field comprising an elevated platform, a steerable front wheel and a pair of driving rear wheels, said front wheel and said rear wheels being supported on narrow supporting structure for passage over the field, a motor mounted on said frame in line with said front wheel and having a narrow transverse dimension to permit minimum interference with rows of vegetation passing between said front and rear wheels, a combination transmission and differential mounted on said frame adjacent said rear wheels, a variable speed drive between said motor and said transmission, shafts extending from said transmission to the adjacent edges of said frame, a gear reduction unit at the end of each shaft and having an exposed sprocket, a chain drive between the cooperating sprocket and a sprocket on the adjacent rear wheel whereby sufficient power is applied to the rear wheels for moving the machine through the fields, a pair of downwardly extending rails are mounted closely adjacent the rear wheels and an angle member is mounted on each rail, a single hydraulic cylinder being operatively connected to both of said angle members for moving said angle members from a position adjacent the ground to an elevated position and means whereby the angle members will be retained in any of their adjusted positions.

2. An agricultural machine for movement over a field comprising an elevated platform, a steerable front wheel and a pair of driving rear wheels, said front wheel and said rear wheels being supported on narrow supporting structure for passage over the field, a motor mounted on said frame in line with said front wheel and having a narrow transverse dimension to permit minimum interference with rows of vegetation passing between said front and rear wheels, a combination transmission and differential mounted on said frame adjacent said rear wheels, a variable speed drive between said motor and said transmission, shafts extending from said transmission to the adjacent edges of said frame, a gear reduction unit at the end of each shaft and having an exposed sprocket, a chain drive between the cooperating sprocket and a sprocket on the adjacent rear wheel whereby sufficient power is applied to the rear wheels for moving the machine through the fields, a pair of downwardly extending rails are mounted closely adjacent the rear wheels and an angle member is mounted on each rail, a single hydraulic cylinder being operatively connected to both of said angle members for moving said angle members from a position adjacent the ground to an elevated position and means whereby the angle members will be retained in any of their adjusted positions, a lifting bar mounted on said angle members and a transversely extending bar closely adjacent the bottom of said rails to which transverse bar a pair of drawbars may be pivotally attached, said draw bars being adapted for connection to drag links extending between said lifting bar and said draw bars whereby an implement may be towed and raised by said draw bars upon raising said angle members.

3. The invention according to claim 2 in which a fixed pivot means is provided above said transverse bar to which a control link may extend to a fixed pivot on an implement to be towed.

4. A fork lift comprising a vertically disposed rail formed of two I-beams arranged with their flanges in edge-to-edge relation and fixedly secured together, a pulley mounted between said I-beams so as to have a portion projecting outwardly of one surface formed by the flanges of said I-beams, a channel member having a depth greater than the combined widths of the flanges of said I-beams embracing said I-beams with the web thereof spaced from said one surface of the I-beam to provide a cable accommodating space, a plurality of rollers mounted on the flanges of said channel member and engaging with the inner surface of the exposed flange portions of said I-beams, an article supporting tine projecting from said channel member for receiving a load thereon and means to fix a cable on said tine whereby the fork lift may be raised or lowered by tensile force on said cable on the side of said pulley away from said tine.

5. The invention according to claim 4 in which the channel member is reinforced adjacent the rollers by U-shaped members having legs engaging the flanges of the channel member and with the bight portion of the U-shaped member serving as a strut and spaced from the web of said channel member.

6. A fork lift comprising a pair of upstanding rails, means to support said upstanding rails in substantially fixed parallel relation with respect to each other, a tine extending outwardly from each rail in substantially parallel relation to the other tine, a cable means connected to each tine at one end thereof, power means connected to the other end of each cable means for raising the corresponding tine when the power means is applied to tension and pull the cables, said tines being separately movable except for the raising movement caused by the pull on said cable means whereby any slight irregularity or difference in loading will not cause binding.

7. A tobacco harvester for movement over a field comprising an elevated workmen supporting platform positioned at a height to clear growing tobacco plants, a steerable front wheel supported from said platform for movement in a furrow, a pair of driving rear wheels supported from the rear of the platform for location in spaced furrows, the front wheel and said rear wheels being supported on a narrow supporting structure extending upwardly from each wheel to the platform to provide for movement in the furrows between the rows of tobacco plants, said front and rear wheels being so positioned to provide for straight passages for rows of tobacco plants on each side of said front wheel, a motor suspended from said platform in line with and in the rear of said front wheel and having a narrow transverse dimension thereby minimizing interference with rows of vegetation on opposite sides of the front wheel, said motor lying between said wheels lowering the center of gravity of said harvester and increasing stability while maintaining high clearance, variable speed transmission means suspended from said platform adjacent said rear wheels, power driving means connected between said variable transmission and each of said rear wheels whereby adequate power is applied to the rear wheels for moving the harvester through the fields, an inclined rail extending downwardly and rearwardly from the platform closely adjacent each rear wheel, a horizontally positioned rearwardly extending bar member mounted on each inclined rail for substantial movement, said bar members being horizontally spaced apart, power means connected to each of said bar members in unison for positively moving said bar members from a position adjacent the ground to an elevated position whereby said bar members may be maintained in any adjusted position and provide for raising and lowering a load on said bar member.

References Cited in the file of this patent

UNITED STATES PATENTS

| | | |
|---|---|---|
| 2,342,308 | Stueland | Feb. 22, 1944 |
| 2,518,965 | Whitley | Aug. 15, 1950 |
| 2,625,285 | Weaver | Jan. 13, 1953 |
| 2,628,126 | Black | Feb. 10, 1953 |
| 2,704,158 | Long | Mar. 15, 1955 |
| 2,772,010 | Buehring | Nov. 27, 1956 |